D. KINT.
Seeding Machine.
No. 77,052.
Patented April 21, 1868.
Fig. 1.
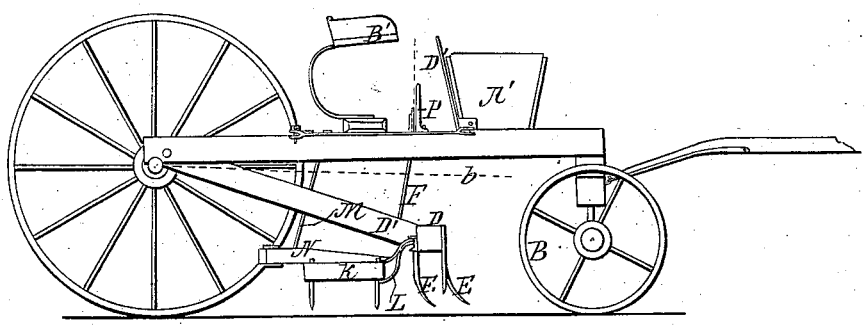
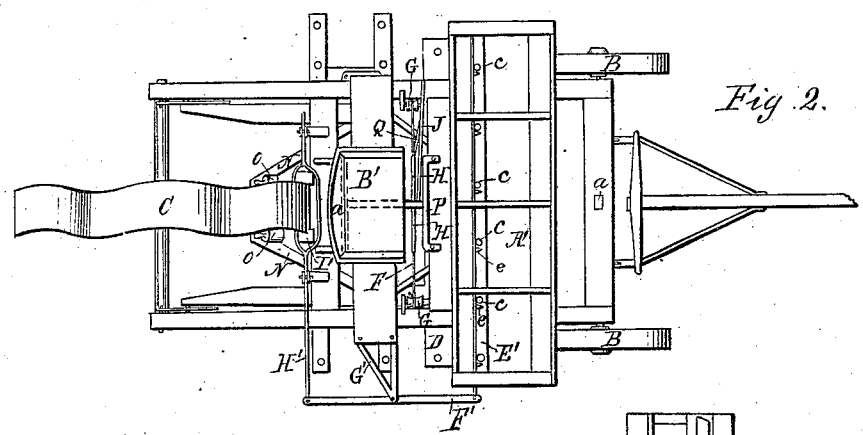
Fig. 2.
Fig. 3.
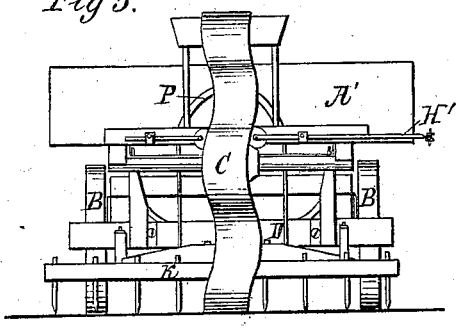
Fig. 4.
Witnesses:
J. H. Burridge
E. E. Waite
Inventor.
D. Kint

United States Patent Office.

DANIEL KINT, OF HASLETON, IOWA.

Letters Patent No. 77,052, dated April 21, 1868.

IMPROVEMENT IN COMBINED SEEDER, CULTIVATOR, AND HARROW.

*The Schedule referred to in these Letters Patent and making part of the same.*

TO ALL WHOM IT MAY CONCERN:

Be it known that I, DANIEL KINT, of Hasleton, in the county of Buchanan, and State of Iowa, have invented certain new and useful Improvements in a Combined Seeder, Cultivator, and Harrow; and I do hereby declare that the following is a full and complete description of the construction and operation of the same, reference being had to the accompanying drawings, making a part of this specification, in which—

Figure 1 is a side view of the machine.
Figure 2 is a top view.
Figure 3 is a view of the rear end.
Figure 4 is a detached section.

Like letters of reference refer to like parts in the views.

A, fig. 1, is a frame, mounted upon the three wheels B, B, and C, of which B B are the front wheels, attached to the frame by a king-bolt, a, which allows of their being turned about, as are the front wheels of an ordinary wagon, whereas the hind wheel C is secured rigidly to a shaft, D, fig. 2, which has its bearings in the frame. The margins of the periphery of this wheel, as will be seen, are indented or curving, the purpose of which will hereafter be shown.

Suspended from the under side of the frame A is a cultivator, D', consisting of the frame D'', the front bar of which is armed with a series of cultivator-teeth, E, fig. 1.

The rear end of the sides of the cultivator are pivoted to the ends of the frame H', whereas the front is suspended by the cords or chains F. Said chains are carried up over the sheaves G, and connected to the extreme ends of the arms H. These arms, as will be observed, are secured to and project outward each way from the shaft I, by which they are made to vibrate, by means of the lever J, for the purpose of lifting the cultivator, as will hereafter be shown.

To the under side of the cultivator is attached the front side of the harrow K, by the links or stirrup L, fig. 1. This stirrup being pivoted to the cultivator, allows to it a lateral vibratory movement, given to it by the wheel C, as will hereafter be described.

The rear side of the harrow is suspended from the frame by the chain M, fig. 1, which is also carried up and passed over sheaves, and connected to the extreme ends of vibratory arms, indicated by the dotted lines a, fig. 2. Said arms being secured to the shaft I in like manner and position as the arms H, are operated conjointly with them, by means of the lever J, alluded to.

N, fig. 2, are braces secured diagonally across the top of the harrow, and proceed convergingly backward, so far as to embrace the rim of the wheel C. At the extreme end of these braces are secured friction-rollers, O, and which are so adjusted as to engage the sides of the wheel, as shown in fig. 2.

The practical operation of this machine is as follows:

On being placed in the field, the cultivator and harrow are then lowered to the ground, as shown in fig. 2. As the machine progresses, the teeth F stir up the ground in a deep, thorough manner, leaving it in ridges and furrows, but which is levelled and smoothed down by the harrow, which immediately follows the work of the cultivator.

The harrow, as it moves forward, is, at the same time, made to vibrate transversely, by means of the curving edges of the wheel C, exerted upon the friction-rollers O, thereby effecting a cross-harrowing of the ground, saving, by this means, the time, trouble, and expense of going over the field for the second harrowing.

The cultivator and harrow are lifted from the ground to avoid obstructions, or for moving from place to place, by means of the lever J, as indicated by the dotted lines b, fig. 1, and secured there by the lever being caught in a notch in the side of the frame P, against which it is pressed by the spring Q.

Having thus described the construction and operation of the machine as a cultivator and harrow, I will now proceed to describe the seeding-apparatus, to be used in connection with it, and which is as follows, viz:

In fig. 2, A' represents a seed-box, mounted upon the fore part of the frame, immediately in front of the operator's seat B'. In the bottom of said box is a series of holes, c, through which the seed falls to the ground. These holes are closed by a slide, C', arranged on the under side of the box, as shown in fig. 4. In said slide are holes, corresponding in size and number to those in the bottom of the box, which, when brought in open relation to them, allow the seed to fall through to the ground, and closing the holes on changing such open relation. D' is a lever, by which the slide is operated.

E', fig. 2, is an agitator or feeder, and which is made to vibrate, causing the points e to pass across the holes, thereby removing any obstruction, so that the seed may run freely out. This agitator is operated by the lever F', pivoted to the machine by the stay G'. H' is a link, connecting said lever to the wheel C, by which it is operated, by means of the friction-rollers I', so arranged as to embrace the sides of the wheel, as shown in the drawing.

By this arrangement, it will be obvious that, as the wheel C revolves, the curved sides will give a reciprocating movement to the link H', which will vibrate the lever, causing a reciprocating movement of the agitator, for the purpose above said.

By this combined machine, the seeding, cultivating, harrowing, and cross-harrowing can be accomplished at one operation, saving thereby largely in time and labor, in going over the field for the several operations, as is necessary when done in the ordinary way.

The machine, however, may be used singly for either of the purposes above mentioned, the seed-box being easily detached and removed, and the cultivator and harrow, in like manner, can be disconnected from each other, and used singly, if so desired.

The amount of seed allowed to fall from the box can be graduated by the distance that the holes are opened, a ratchet, a', fig. 4, being provided for holding the lever, so that the slide will be secured at any degree that the holes are opened, thereby regulating the quantity of seed required to pass out.

What I claim as my improvement, and desire to secure by Letters Patent, is—

1. The agitator E', lever F', link H', and friction-rollers I', constructed and arranged to operate in the manner and for the purpose specified.

2. The cultivator D and harrow K, as constructed and arranged in relation to each other, and operated by the wheel C, arms H a, and lever J, in the manner and for the purpose substantially as set forth.

3. The combination of the seeder A', cultivator D, and vibratory harrow K, when constructed and arranged to operate conjointly in the manner and for the purpose set forth.

DANIEL KINT.

Witnesses:
GEORGE KINT,
T. BAUCHART.